Feb. 12, 1952      T. MÜLLER      2,585,574
RADIAL PUMP AND RADIAL MOTOR HYDRAULIC TRANSMISSION
Filed Aug. 29, 1947      2 SHEETS—SHEET 1
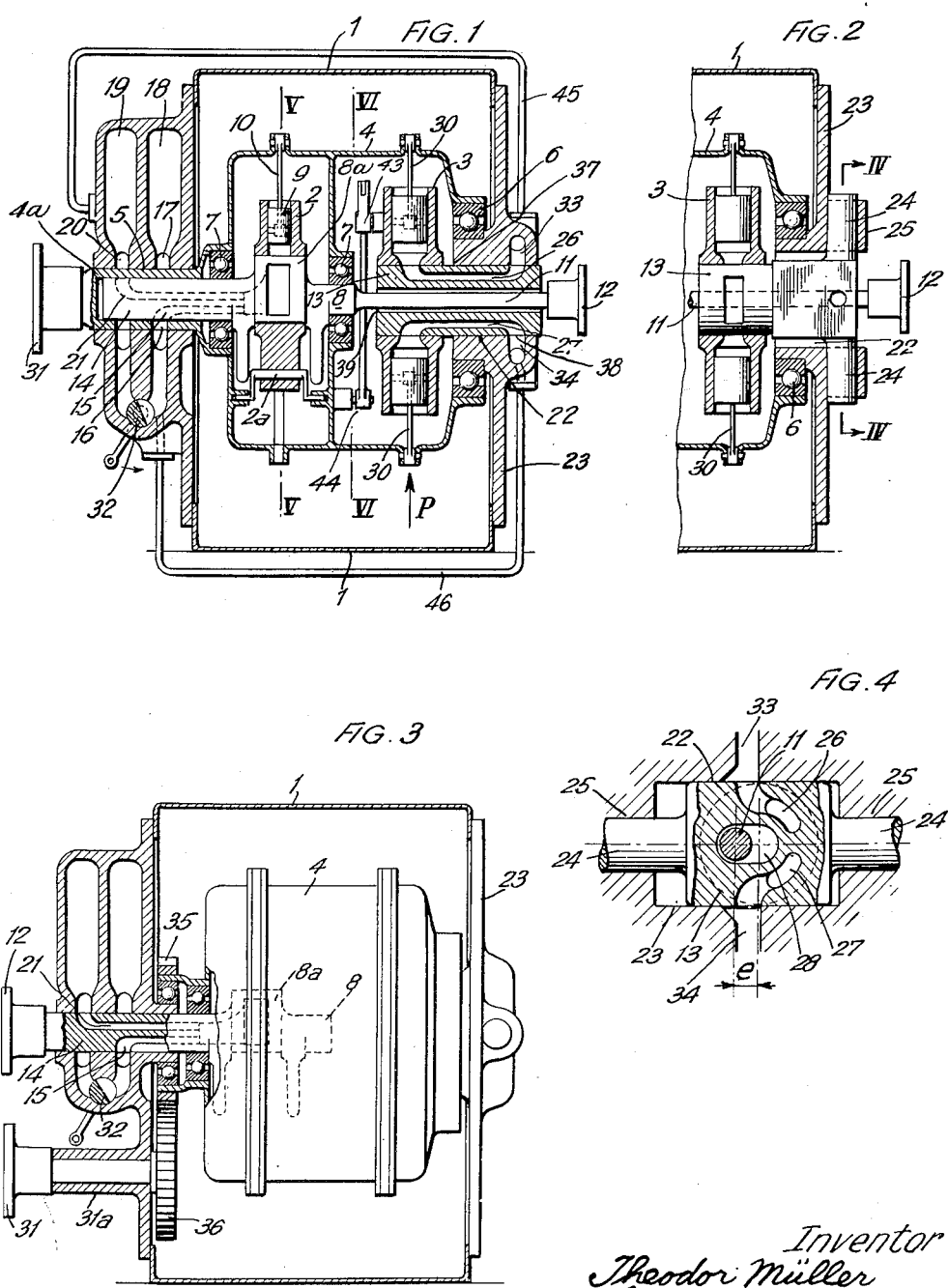
Inventor:
Theodor Müller
by Sommers & Young
Attorneys Feb. 12, 1952 — T. MÜLLER — 2,585,574
RADIAL PUMP AND RADIAL MOTOR HYDRAULIC TRANSMISSION
Filed Aug. 29, 1947 — 2 SHEETS—SHEET 2
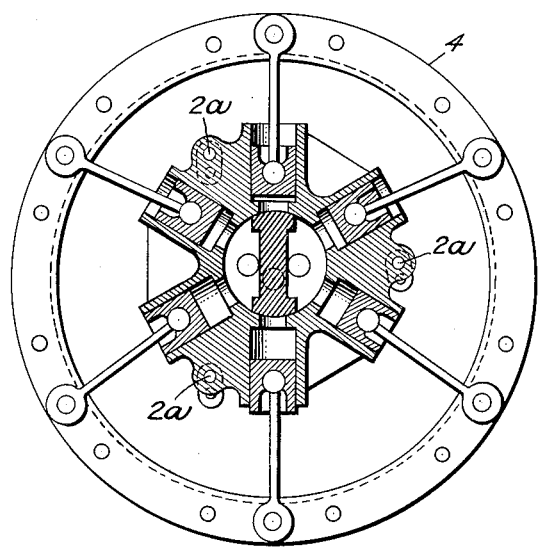
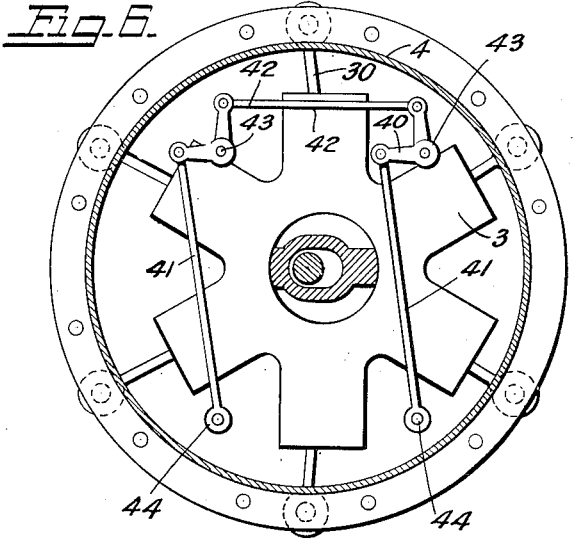
Inventor
Theodor Müller
By Sommers + Young
Attorneys Patented Feb. 12, 1952

2,585,574

UNITED STATES PATENT OFFICE 2,585,574

RADIAL PUMP AND RADIAL MOTOR
HYDRAULIC TRANSMISSION

Theodor Müller, Winterthur, Switzerland, assignor to Schweizerische Lokomotiv- und Maschinenfabrik, Winterthur, Switzerland Application August 29, 1947, Serial No. 771,317
In Switzerland July 13, 1942

Section 1, Public Law 690, August 8, 1946
Patent expires July 13, 1962

4 Claims. (Cl. 60—53)

This invention relates to piston operated hydraulic transmissions, comprising a primary liquid pump unit and a secondary liquid motor unit with so-called divided output which may be termed hydraulic coupling transmissions for the reason that in adjusting the stroke of the secondary part (motor part) to zero the transmission can operate as a transmission in that the liquid then enclosed in the primary part (pump part), operating at constant or invariable stroke, allows of transmitting the driving torque of the motor directly to the driven shaft.

With such transmissions it is known to arrange the cylinder blocks of the primary and secondary part that are provided with radial cylinder arrangements (spider shape) in a common rotatable casing upon which act the piston thrusts of the primary and secondary part. The control of the liquid circulation is effected in such an arrangement by the piston, themselves establishing communication, via openings in sliding pads carried by the pistons, with the liquid carrying spaces in said common casing. The adjustment of the eccentricity of the secondary part is effected by eccentric straps.

It is further known to unite the radial cylinder arrangements of the primary and secondary part of such gearings into a single spider shaped structure in such manner that the cylinders lie in a common plane with the cylinder heads of the pump cylinders facing outwardly and those of the motor cylinders facing inwardly, rotary control valves being provided one of which serves as the driving shaft while the other remains fixed in position. Readjustment of the eccentricity of the motor part (secondary part) is effected by displacement of the rotatable casing surrounding the radial cylinder assembly. Although in such arrangements the control is improved the arrangement of the secondary cylinders results in highly irregular liquid induction which brings with it the risk of the setting up of hammering. Furthermore the cylinder clearance becomes very great and the presence of a roller bearing of large diameter for the rotatable casing on the side of the transmission on which the control means are arranged is for practical reasons hardly feasible.

Another proposed arrangement in which the primary cylinder block and the secondary cylinder block are firmly connected with each other cannot be considered as a complete solution of the problem involved either for the reason that a practicable way for carrying out the liquid control and the mounting of the shafts and cylinder blocks has not been shown.

The invention consists in a hydraulic transmission in which radial cylinder arrangements of a primary pump part and a secondary motor part are accommodated in a common rotatable casing to which the pistons of the pump part and the motor part are connected and the secondary radial cylinder arrangement is rotatably mounted on a bearing plug in overhung relation to a fixed casing, characterised by the provision of a control device for the cylinders in which the liquid passages are included in the bearing plugs (e. g. 8a, 13) on which the radial cylinder arrangements of the pump part and the motor part are rotatably mounted.

By this means the advantages inherent in the control by means of rotary valves, i. e., large cross sections together with slight leakage losses are put into useful service. Furthermore, the cumbersome roller bearing on the side of the secondary part with adjustability of stroke is reduced to a practicable size for the reason that the control ducts of the pump operating at constant stroke and those of the motor part operating at variable stroke need no longer both be accommodated within this roller bearing but only those of the secondary part.

Two exemplifications of the transmission according to the invention are illustrated, by way of example only, in the accompanying drawings, in which:

Fig. 1 is a sectional elevation of a first exemplification;

Fig. 2 shows a sectional top plan view inclusive of a displaceable control plug;

Fig. 3 shows an elevation partly in section of a second exemplification;

Fig. 4 is an enlarged, partial cross section of the control plug of the secondary part on the line IV—IV in Fig. 2.

Fig. 5 is a cross sectional view on the line V—V of Fig. 1.

Fig. 6 is a cross sectional view on the line VI—VI of Fig. 1.

In a stationary casing 1 a rotatable casing 4 including the two radial cylinder arrangements 2, 3 of the pump part and the motor part respectively is journaled in a slide bearing 5 and a large roller bearing 6. The pump crankshaft 8 by means of two ball bearings 7 is rotatably mounted in the rotatable casing 4, and the pump stroke is invariable. On an eccentric portion 8a of the crankshaft 8 is rotatably mounted the radial cylinder arrangement 2 of the pump the pistons 9 of which are pivoted to the casing 4 by means of connecting rods 10. The radial cylinder arrangement 2 and the casing 4 are coupled to each other by three auxiliary cranks 2a the eccentricity of which is equal to that of the crank 8a, Fig. 5.

The crankshaft is provided on one side with an extension 11 on which a driving flange 12 is arranged. This shaft protrudes through the control plug 13 on which the secondary radial cylinder arrangement 3 of the motor part is rotatably mounted. On the other side of the crankshaft an extension 14 is provided in which two passages 21 and 15 for conveying working liquid into and from the pump cylinder are accommodated. The liquid delivery passes through the passage 15 in the shaft 14 and a port 16 in the bearing pin 4a of the casing 4 over into an annular passage 17 communicating with a pressure equalising vessel 18. The reference numeral 19 denotes a suction pressure equalising vessel communicating with an annular passage 20 from which the liquid is conducted through the passage 21 in the shaft 14 to the pump cylinder 2.

The displaceable control plug 13 of the secondary part is as shown in Figs. 1, 2 and 4 horizontally displaceably arranged in a slide guide 22 in a bearing carrier shield 23 and is guided by means of appertaining studs 24 in guides 25 on the covering shield 23 transversely of its longitudinal axis. The plug 13 can be adjusted by any suitable means. If, for example, the guides 25 are constructed as closed cylindrical pockets the guide plug can be shifted by means of pressure oil selectively acting upon the respective ends of the guide studs 24 then being in the form of servomotor plungers. The pistons cooperating with the radial cylinder arrangement 3 of the motor part are pivotally connected to the common casing 4 by means of connecting rods 30. The cylinders 3 and the casing 4 are interconnected by a coupling which ensures synchronous operation of these two parts, Fig. 6. For this purpose the casing 4 and the cylinder block 3 of the secondary part are coupled with each other by the connecting links 40, 41, 42 hingedly connected to the motor casing 3 and the casing 4, the type of this linkage being known under the name of Ganz' coupling. The bolts 43 of the bell crank levers 40 are rigid with the cylinder block 3, and the bolts 44 are rigid with the casing 4. This coupling permits in known manner to vary the eccentricity of the axes of rotation of the radial cylinder-block 3 and of the casing 4 of the secondary part, whereby these members are obliged to turn in a completely synchronous manner.

In the control plug 13 passages 26 and 27 for respectively discharging and supplying of working liquid are arranged together with a throughbore 28 in which the driving shaft 11 is housed. The liquid passages 26, 27 are continued across the slide guide surfaces into passages 33, 34 in the casing covering shield 23 (see Fig. 4), these passages 33, 34 being so arranged that at maximum eccentricity e of the control plug 13 of the secondary part the liquid is given maximum cross sectional area of free passage and most smooth guidance in passing over into the bearing carrier shield 23.

Said passages are further so arranged that the pressure P (Fig. 1) exerted on the radial cylinder arrangement 3 and the control plug 13 through the connecting rods 30, urges the control plug at the point 37 and at the place of transition 38 of the passage 27 against the surface of the slide guide, thereby preventing leakage losses at this place. The passages 33, 34 communicate by conduits 45 and 46 with the annular passages 20 and 17, respectively. A relieving groove communicating with the pressure space of the transmission may be arranged at the point 37 for reducing the bearing pressure at this point.

When the control plug 13 is coaxial with the axis of rotation of the casing 4 the motor part has no liquid admitted thereto so that the pump part is kept from delivering, in consequence whereof, by effect of the pressure oil present therein, direct transmission of power takes place from the shaft 11 to the casing 4 and to the driven shaft 4a, 31. If the control plug 13 is displaced from central position up to the maximum eccentricity e a maximum amount of pressure liquid is admitted to the motor part so as to impart an additional torque of maximum intensity to the rotating casing 4, whereas on the other hand the pump 2 runs at maximum relative speed and the driven shaft 4a, 31 runs slowly, the torque delivered by the shaft 11 being then transmitted directly to the driven shaft via the pump cylinders.

If it is desired to let the driven shaft 31 run at still lower speed than corresponds to the maximum absorbing capacity of the cylinders 3 a rotary valve 32 for passing the excess oil directly into the suction space is opened by which means the speed of revolution of the driven shaft is adjusted down to zero while the torque is maintained at maximum value.

If the axis of rotation of the cylinder arrangement 3 is shifted out of its central position in the direction opposite to the position occupied for low speed running the torque effected by the secondary part of the casing 4 does no longer act in the same direction as the torque of the driving shaft derived from the primary part but is opposed to the latter torque. The driven shaft 4a, 31 receives thereby a torque which is smaller than the driving torque and runs at a higher speed than driving shaft. The secondary part works then as pump and the primary part as motor. If the axis of rotation of the casing 4 is further displaced in the same direction and so far that the countertorque of the secondary part surpasses the torque of the primary part reverse motion is obtained.

The example shown in Fig. 3 varies from that described above in that the transmission of torque from the casing 4 is effected by means of a toothed rim 35 which is fastened to the latter and meshes in a gear 36 on the driven shaft 31a. The driving flange 12 is in distinction from Fig. 1 not mounted on a shaft stub protruding through the control plug 13 but is arranged in the pump crank shaft 14 shown in dotted lines which includes the suction and pressure conduits 21 and 15 respectively for the working liquid. Otherwise the construction and operation of the gearing shown in Fig. 4 is the same as that described in connection with the gearing shown in Figs. 1 to 3.

A modification of the arrangement shown in Fig. 4 may consist in arranging only the pressure passage 15 in the stub shaft 14 and shifting the suction conduit to the other projecting stub shaft on the crankshaft 8 which is prolonged up to the control plug 13, direct communication being provided through the end face 39 of the displaceable control plug 13 with the suction passage 26 arranged at this place.

Driving movement may be imparted to the gearing at 31 instead of at 12. This mode of operation permits of obtaining a constant torque at the flange 12 when the oil pressure is maintained constant within the gearing. This torque is further obtained at a continually variable speed of revolution of this flange from zero up to direct drive while the flanges 12 and 31 run at equal speed of revolution or the former faster than the latter without requiring the circulation control valve 32 to be opened at low speed of revolution.

I claim:

1. In a hydraulic transmission, the combination of a stationary case, a driving shaft having an eccentric rotatably mounted in said case, a pump part of fixed stroke having a cylinder block rotatably mounted on said eccentric, a bearing pin projecting inwardly from one end of said case, said pin having a square portion slidably mounted in a guide slot provided in said case end for movement transversely to the pin axis, a motor part of variable stroke having a cylinder block rotatably mounted on the free end of said pin, a casing rotatably mounted within said case and surrounding the cylinder blocks of said pump part and motor part, said casing having a partition extending between said cylinder blocks of the pump part and motor part, a driven shaft connected to said rotatable casing, said pump part and motor part being of the expansible chamber type having radial cylinders formed in said cylinder blocks, reciprocating pistons, and piston rods pivotally connected to said rotatable casing, a plurality of auxiliary cranks for coupling the pump part cylinder block with said rotatable casing, the eccentricity of said cranks being the same as that of the eccentric of said driving shaft, coupling means for interconnecting the cylinder block of the motor part and said rotatable casing to provide for synchronous rotation of said motor part cylinder block and said rotatable casing, said driving shaft being provided with suction and delivery ducts for conveying working liquid to and from the cylinders of said pump part, said transversely movable bearing pin being provided with suction and delivery ducts for conveying working liquid to and from the cylinders of said pump part, said transversely movable bearing pin being provided with suction and delivery ducts for conveying working liquid to and from the cylinders of said motor part, conduits for interconnecting the delivery duct of one part to the suction duct of the other part, and means for moving said bearing pin in said guide slot transversely relatively to the driving shaft for adjusting the piston stroke of said motor part.

2. In a hydraulic transmission, the combination of a stationary case, a driving shaft having an eccentric and extending through said case, a pump part of fixed stroke having a cylinder block rotatably mounted on said eccentric, a bearing pin projecting inwardly from one end wall of said case, said pin having a square portion slidably mounted in said end wall for movement transversely to the pin axis, a motor part of variable stroke having a cylinder block rotatably mounted on the free end of said pin, a casing rotatably mounted within said case and surrounding said cylinder blocks of the pump part and motor part, said rotatable casing having a partition extending between said cylinder blocks of the pump and motor parts, a driven shaft rigid with said rotatable casing, said pump part and motor part being of the expansible chamber type having radial cylinders formed in said cylinder blocks, reciprocating pistons and piston rods pivotally connected to said rotatable casing, auxiliary cranks for coupling the pump part cylinder block to said rotatable casing, the eccentricity of said cranks being the same as that of the eccentric on said driving shaft, coupling means for interconnecting the cylinder block of the motor part and said rotatable casing to provide for synchronous rotation of said cylinder block and casing, said driving shaft being provided with suction and delivery ducts for conveying working liquid to and from the cylinders of the pump part, said bearing pin being provided with suction and delivery ducts for conveying working liquid to and from the cylinders of said motor part, two air vessels carried outside of the stationary casing and communicating with said suction duct and said delivery duct, respectively, provided in the driving shaft, a conduit for connecting the delivery duct of the pump part to the suction duct of the motor part, a conduit for connecting the suction duct of the pump part to the delivery duct of the motor part, means for moving said bearing pin in said guide slot transversely relatively to the driving shaft for adjusting the piston stroke of the motor part, and manually operable valve means for establishing communication between said two air vessels.

3. In a hydraulic transmission, the combination of a stationary case, a driving shaft having an eccentric rotatably mounted in said case, a pump part of fixed stroke rotatably mounted on said eccentric, a bearing pin projecting inwardly from one end wall of said case in a direction parallel to the driving shaft, said pin having a square portion slidably mounted in a guide slot provided in said end wall for movement of the pin transversely of the axis of the driving shaft, a motor part of variable stroke rotatably mounted on the free end of said bearing pin, a casing rotatably mounted within said stationary case and surrounding said pump part and motor part, a driven shaft connected to said rotatable casing, said pump part and motor part having radial cylinders, reciprocating pistons and piston rods pivotally connected to said rotatable casing, said driving shaft being provided with suction and delivery ducts for conveying liquid to and from said pump part, said bearing pin being provided with suction and delivery ducts for conveying liquid to and from said motor part, said end wall of the stationary case being provided with suction and delivery ducts communicating across the guide surfaces of said square portion of the bearing pin and of said guide slot with the suction and delivery ducts, respectively, of said bearing pin, the suction and delivery ducts in said end wall communicating with said delivery and suction ducts, respectively, provided in the driving shaft, and means on said end wall for slidably guiding said bearing pin transversely to the longitudinal axis thereof and for preventing longitudinal movement of the pin.

4. Hydraulic transmission mechanism as claimed in claim 3, in which said rotatable casing is provided with a gear crown meshing with a gear wheel on the driven shaft permitting the power input and power output to be disposed on the same side of the stationary case.

THEODOR MÜLLER.

REFERENCES CITED

The following references are of record in the file of this patent:

UNITED STATES PATENTS

| Number | Name | Date |
|---|---|---|
| 1,188,901 | Conradson | June 27, 1916 |
| 1,437,885 | Beatty | Dec. 5, 1922 |
| 1,462,874 | Slater | July 24, 1923 |
| 1,484,960 | Peck | Feb. 26, 1924 |
| 1,545,678 | Miller | July 14, 1925 |
| 1,604,321 | Schneider | Oct. 26, 1926 |
| 1,695,289 | Lee | Dec. 18, 1928 |
| 1,697,253 | Schneider | Jan. 1, 1929 |
| 1,763,565 | Parker | June 10, 1930 |
| 1,819,716 | Mackenzie | Aug. 18, 1931 |
| 1,852,335 | Rosen | Apr. 5, 1932 |
| 2,099,630 | Schneider | Nov. 16, 1937 |
| 2,141,168 | Bischof | Dec. 27, 1938 |
| 2,419,059 | de Villiers | Apr. 15, 1947 |